April 18, 1961 E. W. HOLMAN, JR 2,979,858
TOY
Filed March 2, 1959

INVENTOR
E. W. HOLMAN, JR.
BY
ATTORNEY

United States Patent Office 2,979,858
Patented Apr. 18, 1961

2,979,858

TOY

Edward W. Holman, Jr., 1310 Sewanee Ave.,
Florence, S.C.

Filed Mar. 2, 1959, Ser. No. 796,320

5 Claims. (Cl. 46—52)

This invention relates to educational or instructive devices intended to create interest and entertainment and thereby promote the enlargement of the horizon and consequent knowledge of a particular subject as well as to encourage the exercise both of the mind and of the body so that the individual will have a cheerful philosophy of life and consequently will be in a better condition to cope with everyday problems which arise.

The invention relates also to action toys which can be readily operated with effort of a smaller or greater degree to produce interesting action and sound and all of which are susceptible of variation by the manner of movement of the toy and by slight modification thereof.

Educational and instructive toys and other devices have been produced of many kinds, but have not kept abreast of the times and the need for toys particularly appropriate for the times always is desirable since public interest is directed along a particular line which in the present era is on bodies projected from the earth and which travel in outer space and are designated as satellites.

Another object of the invention is to provide a weight on the end of a string, the weight being in the form of a generally spherical body and the string being in the form of an elastic cord or band and in the proper proportions that the band may be held by its free end and the weights swing in a circle and by the speed of the swing the elastic band extended by centrifugal force for the production of sound by the engagement of the air and vibration and which is variable according to the amount of stretch in the band.

A further object of the invention is to provide a toy representing a space satellite, which toy can be modified both as to appearance and shape and to produce variation in sound and action, simulating the whirling of a satellite through space by swinging the device in a circle above the head so that it emits sounds or signals attracting the attention of third persons and interesting the operator.

A further object of the invention is to promote the teaching of science as well as the science of teaching by providing a toy representing a satellite and which toy can be projected and caused to whirl or rotate and produce an interesting sound of a whirring or whistling nature variable by the operator.

Figure 1:
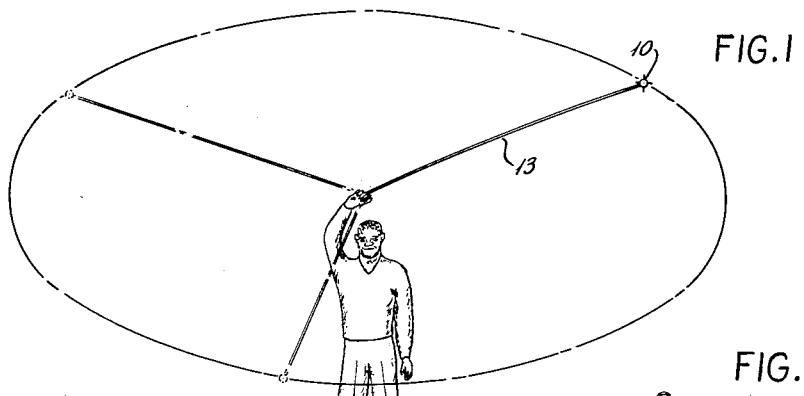
Figure 2:
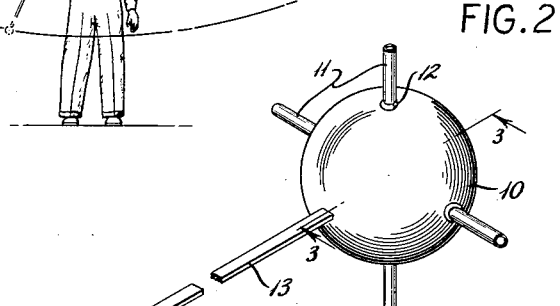
Figure 3:
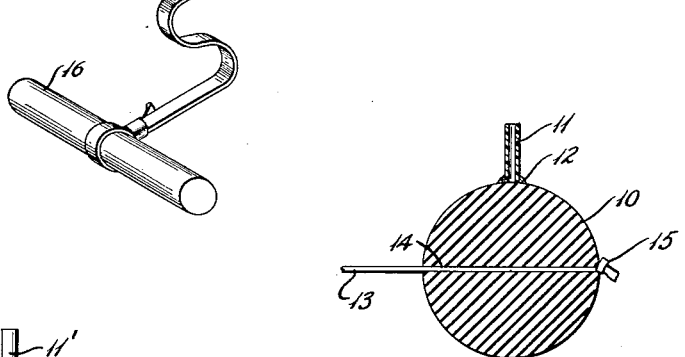

Other objects and advantages of the invention will be apparent from the following description taken in conjunction with the accompanying drawing wherein:

Fig. 1 is a perspective illustrating the use of one application of the invention;

Fig. 2, a perspective of the device itself;

Fig. 3, a section of the device along line 3—3 of Fig. 2; and

Figure 4:
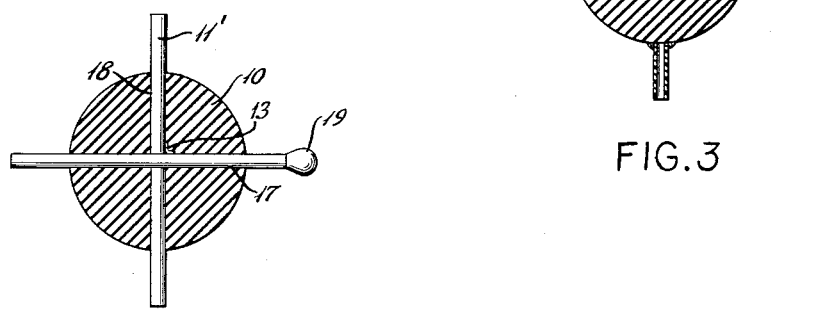

Fig. 4, a cross-sectional view of a modification of the device.

Briefly stated, the device is a generally spherical object or ball which may be of rubber, plastic, or other material with projections applied thereto at intervals around the ball to form antenna to simulate the Russian sputnik and with a suspension element in the form of a relatively flat elastic band of any desired length attached through or to the ball. In the use of the device the flat elastic band produces a humming sound when the ball is whirling around and the hollow tubes contribute to the sound, the antenna imparting a twist to the ball during its motion and caused by the resistance of the air and in turn causing the twisting of the band against the wind producing humming noises or signals simulating to a degree the noises given out by a space satellite.

With continued reference to the drawing, the device comprises a generally spherical body 10, preferably of sponge rubber or other resilient material having air cells or otherwise composed in order that it may readily be swung in the air without injury to person or property it might strike. It may have pins or projections in the form of tubes 11 if desired, and composed of any desired material such as rubber or plastic and of any desired length, but with such tubes or projections preferably, like the ball, of sufficient softness and resiliency not to injure personal property should the device happen to strike the same.

The tubes or projections should be in proportion to the size of the ball to which they are attached and to the sound which they are desired to produce, it having been found that projections approximately of $3/4''$ to $1 3/4''$ in length may be employed with the ball slightly larger than an inch in diameter, it being contemplated that the projections will be of any desired character to produce sound and may be attached to the base by cement 12.

The ball or weight is attached to one end of a string or band of rubber 13 preferably $1/8''$ to $3/16''$ in width with the band extending through a diametrical opening 14 in the ball 10 and with a knot 15 for preventing the ball from becoming detached from the band. Also, if desired, a handle 16 may be attached to the remote end of the band from the ball which may be gripped and the device swung at high speed, it being essential that the proportion of the weight, size and elasticity of the band be so coordinated with the ball that the relationship is obtained for the best results.

If desired, instead of relatively short projections 11 attached by cement 12 at their ends to the ball, projections 11' tubular or otherwise may be inserted through openings 17 and 18 in the ball 10. Also, if desired, more weight may be added to one side of the ball, such, as for example, by supplying a weight 19 to an end of one of the projections 11 or 11' in order to produce irregular motion. When using long projections 11' as illustrated in Fig. 4 the band 13 will pass through the ball immediately adjacent the center thereof and will bend against the projections 11' where the projections intersect each other in the center of the ball.

From the foregoing it will be apparent that the device of the present invention is unusual in appearance, incites interest, teaches the user physical principles including those relating to centrifugal force, speed and vibration produced as a result thereof, sound and modification thereof, and other things all of which motivate and stimulate the mind and give exercise so necessary to the proper functioning of both the mind and the body.

It will be obvious to those skilled in the art that various changes may be made in the invention without departing from the spirit and scope thereof and therefore the invention is not limited by that which is illustrated in the drawings and described in the specification, but only as indicated in the appended claims.

What is claimed is:

1. An educational instructive satellite simulating toy comprising a generally spherical weight forming ball having a resilient surface so that it will not cause injury upon impact, an elastic band having one end attached to said ball, said band being of a size to support said ball and to stretch by the action of centrifugal force when the end of the band opposite that attached to the ball is engaged and the ball centrifugally swung, said elastic band being of a width and thickness to vibrate by movement through the air during the swinging of the ball and produce a whirring or whistling sound, said ball having relatively soft tipped tubular projections in excess of two and arranged in spaced relationship to each other and extending from different portions of its surface and perpendicular to the length of the stretched band whereby sound is produced by contact with the air during the swinging of the ball.

2. An educational instructive satellite simulating toy comprising a ball, an elastic band having one end attached to said ball, said band being of a size to support said ball and of a slenderness to stretch by the action of centrifugal force when the end of the band opposite that attached to the ball is engaged and the ball centrifugally swung, said elastic band being of a width and thickness to be caused by the wind to vibrate and produce sound during the swinging of the ball, projections in excess of two and arranged in spaced relation to each other in directions perpendicular to the stretched band and forming sound producing means by contact with the air during the swinging of the ball.

3. The invention as set forth in claim 1 wherein less than all of the projections is tipped with a weight to make the same heavier than other projections.

4. The invention as set forth in claim 1 wherein at least one of the projections is a hollow tube.

5. The invention as set forth in claim 4 wherein all of said projections extend diametrically of said ball.

References Cited in the file of this patent

UNITED STATES PATENTS

| | | |
|---|---|---|
| 522,264 | Lumley | July 3, 1894 |
| 2,525,221 | Hinsen | Oct. 10, 1950 |
| 2,662,337 | Burkey | Dec. 15, 1953 |